No. 802,933. PATENTED OCT. 24, 1905.
G. HUHN.
METALLIC PACKING RING FOR STUFFING BOXES.
APPLICATION FILED MAY 10, 1904.

Witnesses:
John D. Wise
Gladden Sayler

Inventor:
G. Huhn,
By
Attys.

UNITED STATES PATENT OFFICE.

GUSTAV HUHN, OF BERLIN, GERMANY.

METALLIC PACKING-RING FOR STUFFING-BOXES.

No. 802,933.      Specification of Letters Patent.      Patented Oct. 24, 1905.

Application filed May 10, 1904. Serial No. 207,295.

*To all whom it may concern:*

Be it known that I, GUSTAV HUHN, a subject of the German Emperor, and a resident of Berlin, Germany, have invented new and useful Improvements in Metallic Packing-Rings for Stuffing-Boxes, of which the following is a specification.

The present invention has reference to a metallic packing-ring for stuffing-boxes consisting of several parts which are used for tightly packing piston-rods, valve-rods, and the like.

I am aware that it is known to construct metallic packing-rings for stuffing-boxes in several parts which by means of a spiral spring inclosed in said parts are pressed against the rod to be packed, whereby friction between the rod and the packing is prevented if the rod should oscillate. In such packings the rod continuously slides along the inner surfaces of the packing-rings.

The object of the present invention is to utilize this sliding of the rod along the inner surfaces of the packing-rings for automatically feeding lubricant between rod and packing-rings. For this purpose the packing-rings, which consist of several parts kept together by a spiral spring, are made hollow, fitted with openings in their inner surfaces, and filled with suitable lubricating material. The rod, when moving to and fro sliding along the inner surfaces of the packing-rings, exerts a sucking action on the lubricating material contained in the hollow packing-rings, the lubricating material being thus sucked out of the hollow space and conducted between the rod and the packing-rings. It is obvious that hereby not only the tightness of the packing is increased, but the wear of the material is further reduced to a minimum.

I am also aware that packing-rings are known which are filled with lubricating material and which have openings on their inner surface for the outflow of the lubricant. In such packing-rings, however, the lubricant is fed to the rod by being pressed out of the ring in consequence of the pressure exerted by the screwing down of the gland of the stuffing-box, whereby the cross-section of the packing-rings is changed. It is therefore necessary that such rings are made of soft material which allows the compression of the same. The packing-ring, which forms the object of the present invention, differs from such packing-rings of soft compressible material by being made of solid material—such as cast-iron, red brass, or the like—which material resists even a considerable pressure.

Figure 1:
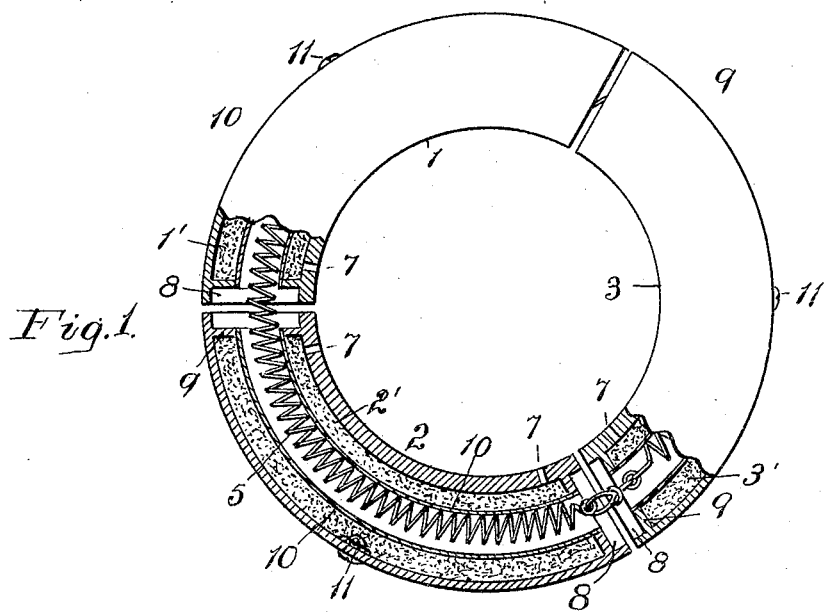
Figure 2:
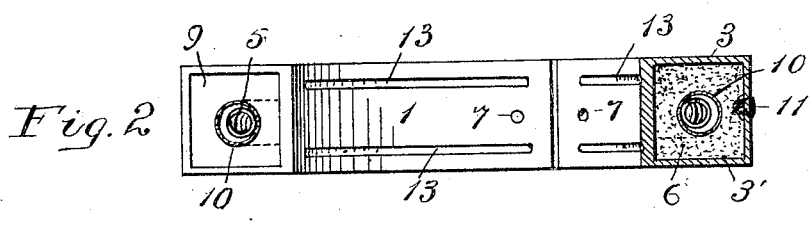
Figure 3:
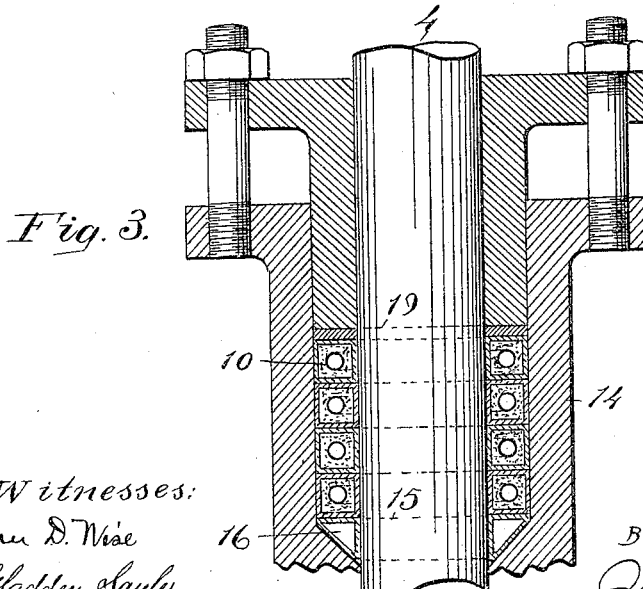

In the accompanying drawings the improved packing-ring is shown, by way of example, in Figure 1 in a side view, partly in section. Fig. 2 is a vertical section through the ring. Fig. 3 is a longitudinal section through a metallic stuffing-box with packing-rings.

The packing-ring consists of three parts 1 2 3, as shown in the drawings, which encircle the rod 4 and are pressed against the same by a spiral spring 5. The hollow parts 1' 2' 3' of the ring are filled with lubricating material 6 and provided at their inner surface with openings 7. The lubricating material 6 is further inclosed between cross-walls 9, which are provided near the end of each of the ring parts 1 2 3. The cross-walls 9 have openings 8 for the passage of the spiral spring 5. In these openings 8 of the cross-walls 9 there are further fixed the ends of a tube 10, which serves as a casing for the spiral spring 5. It is obvious that these tubes 10 prevent the escape of the lubricating material from the ring parts.

Each ring part has an opening on its outer surface which is closed by a screw 11. The wall of the ring is suitably thickened at the place where this opening is situated so as to provide sufficient material for the female thread for the screw 11. On the inner surfaces of the ring there are further provided grooves 13, Fig. 2, which may be of any suitable shape and length.

The packing-rings are used as follows: As can be seen from Fig. 3, a ring 15, of soft material, filled with lubricant and provided with openings 16 on its inner and outer surfaces, is placed on the bottom of the stuffing-box 14, so as to provide an even surface for the lowest packing-ring to rest upon. The packing-rings are suitably placed on one another, so that the ends of the several ring parts alternate in position. The diameter of the packing-rings is suitably chosen, so that between the outer surface of the rings and the inner surface of the stuffing-box 14 a small space is left, so that the several parts of the packing-rings have free play. On top of the packing a ring 19, of asbestos or other suitable material, is placed. It is evident that as the several parts of the ring are continuously tightly pressed against the sides of the piston-rod 4 by means of the spiral springs 5, the rod 4 will be continuously sliding along the inner surface of the ring parts, exerting a sucking action on the lubricating material 6 contained in the same, which material is sucked out through the openings 7 and fed between piston-rod 4 and the inner surfaces of the packing-rings. The grooves 13 on the inner surfaces of the packing-rings serve for storing the lubricating material.

With my improved packing-rings the lubricating material is not supplied to the rod in consequence of a pressure exerted by the gland of the stuffing-box automatically in consequence of the to-and-fro movement of the piston-rod.

The packing-rings, as hereinbefore described, and shown in the drawings, may be modified in details without departing from the idea of my invention, so that, for example, instead of a spiral spring 5 inclosed in the hollow rings spiral springs may be used which are placed around the outer surface of the packing-rings, in which case the openings 8 in the cross-walls 9 would be unnecessary. The several parts of the rings can also be kept together by connecting-links, consisting of spiral springs, which are inserted between the adjacent ends of two ring parts. The cross-walls 9 can be dispensed with if other means are provided for preventing the outflow of the lubricating material through the ends of the ring parts. The openings for filling the lubricant into the ring parts can be situated at any suitable place.

Having fully described my invention, what I claim, and desire to secure by Letters Patent, is—

1. An improved packing for stuffing-boxes comprising hollow rings composed of several parts a lubricating material therein openings on their inner surfaces for the outflow of the lubricating material, and a spiral spring inclosed in the hollow part.

2. An improved packing-ring for stuffing-boxes comprising hollow segmental sections to form a ring, square in cross-section, walls near the ends of each section, a tubular duct extending from end to end of each segment and held by said end walls, and a spiral spring within the tubular duct, as set forth.

In testimony whereof I have hereunto set my hand in presence of two subscribing witnesses.

GUSTAV HUHN.

Witnesses:
 HENRY HASPER,
 WOLDEMAR HAUPT.